(12) United States Patent
Dawnay

(10) Patent No.: US 6,278,822 B1
(45) Date of Patent: Aug. 21, 2001

(54) BRANCHED OPTICAL WAVEGUIDE AND ITS METHOD OF USE

(75) Inventor: Emma Jane Clarissa Dawnay, Wiltshire (GB)

(73) Assignee: Bookham Technology plc, Abingdon (GB)

( * ) Notice: Subject to any disclaimer, the term of this patent is extended or adjusted under 35 U.S.C. 154(b) by 0 days.

(21) Appl. No.: 09/302,413

(22) Filed: Apr. 30, 1999

(30) Foreign Application Priority Data

May 1, 1998 (GB) .................................... 9809458

(51) Int. Cl.$^7$ .................................... G02B 6/26
(52) U.S. Cl. .................. 385/50; 385/2; 385/3; 385/8; 385/9; 385/40; 385/132
(58) Field of Search .................. 385/2, 3, 8–10, 385/37, 40, 50, 132

(56) References Cited

U.S. PATENT DOCUMENTS 5,016,958 * 5/1991 Booth ........................................ 385/3
5,652,807 * 7/1997 Fukuchi ..................................... 385/3

FOREIGN PATENT DOCUMENTS

WO90/09605 8/1990 (WO) .

OTHER PUBLICATIONS

UK Search Report, Patent Act 1977: Search Report Under Section 17(5); 2 pp, Jul. 13, 1998.

* cited by examiner

Primary Examiner—Darren Schuberg
Assistant Examiner—Fayez Assaf
(74) Attorney, Agent, or Firm—Fleshner & Kim, LLP

(57) ABSTRACT

The device comprises an upper silicon layer (10) including two optically connected rib waveguides (3,4) formed in the upper silicon layer (10); a pair of dissimilar materials (6,7) each positioned between the two waveguides (3,4); and an electrical circuit (8,9,13) through the pair of dissimilar materials (6,7), so that an electrical current can be passed through the dissimilar materials (6,7) in both forward and reverse directions, so as to simultaneously heat one waveguide and cool the other waveguide by virtue of the Peltier effect.

7 Claims, 3 Drawing Sheets

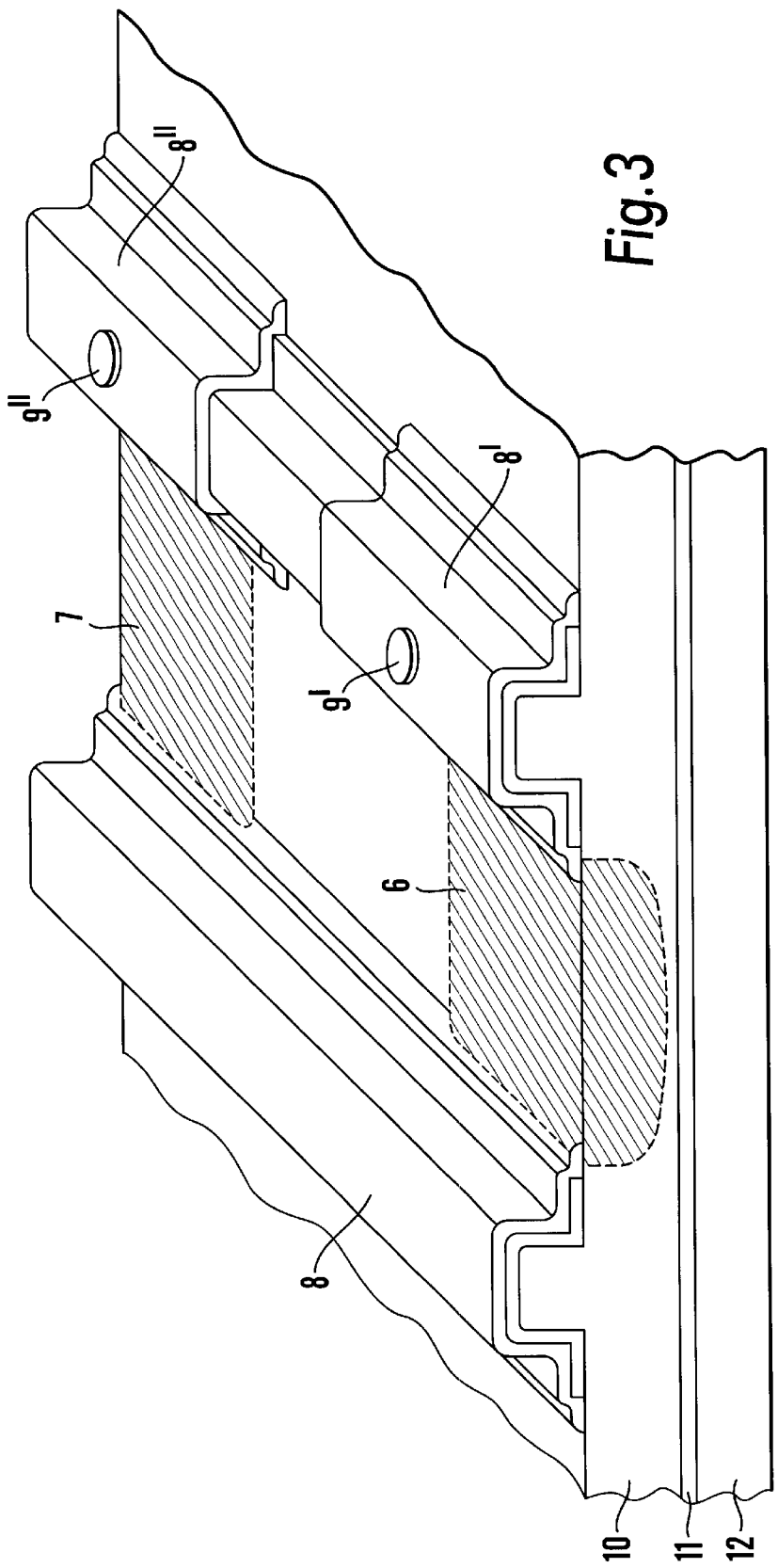

BRANCHED OPTICAL WAVEGUIDE AND ITS METHOD OF USE

BACKGROUND OF THE INVENTION

1. Field of the Invention

This invention relates to integrated optoelectronic devices, especially optically connected optical waveguides; and to their method of use for phase modulation, and switching.

2. Description of the Prior Art

The use of optoelectronic devices in integrated optical circuits, instead of integrated electronic devices, or integrated together with electronic devices on one device, is becoming increasingly important. Examples of materials suitable for use in optoelectronic devices include lithium niobate, and silicon. Silicon, as a basis for integrated optoelectronic circuits, is advantageous since it provides the potential use of standard silicon integrated electronic circuit manufacturing technology, and the integration of optical and electronic circuits on one silicon device. Examples of silicon based optoelectronic devices can be found in EP-A-0720754 and other references given therein. Typically optoelectronic integrated circuits comprise optical waveguides formed on a substrate. For example, a device may comprise a layer of silicon separated from a substrate by a layer of insulating material, such as silicon dioxide, with ribs formed in the upper surface of the silicon to provide one or more waveguides.

Information is coded in optoelectronic devices as a variation of some aspect of the optical output from a light source such as an LED (Light Emitting Diode) or a laser diode. The aspect of the optical output, which is typically varied, is the amplitude, the time length of the pulses, or the phase of the optical output. The variation in the optical output may be achieved by direct variation of the output of the light source, or more usually by passing the light through a material whose optical properties (usually the refractive index) can be modified by an external means. For example, the refractive index of certain materials can be modified by applying an electric field (electro-optic effect), applying a magnetic field (magneto-optic effect), or applying heat (thermo-optic effect). The refractive index of certain semiconductor materials, such as silicon, can also be modified by controlling the density of free charge carriers in the material, by so-called "free carrier injection" or "free carrier depletion". Optoelectronic devices which modify the refractive index of their constituent materials by altering the density of free charge carriers are described, for example, in EP-A-0720754. Lithium niobate devices, and the silicon on insulator devices, described above, are typical materials which will exhibit electro-optic, magneto-optic, or thermo-optic behaviour, and whose refractive indices can be altered by carrier injection.

One known example of an optoelectronic device that can be incorporated in an integrated optoelectronic circuit is an interferometer, such as a Mach Zehnder interferometer. Such a device typically comprises a branched silicon waveguide: a stem waveguide dividing into two branches, which recombine to provide an exit waveguide. The branches of the waveguides generally extend substantially parallel to each other over the majority of the length of the interferometer. It is known to use a Mach Zehnder device for switching. This is achieved by introducing a relative phase shift in the light passing through the branches of the waveguide, the exit waveguide of the device registering the switch as "on" when there is no relative phase shift between the two branches of the waveguide, and "off" when there is a relative phase shift of $n \times \pi$ (where n is an integer) between the two branches of the waveguide. The relative phase shift is introduced by modifying the refractive index in one of the branches of the device. In general, as the refractive index of a transparent material is changed, the phase of light passing through it is changed as well: the bigger the change in refractive index, the bigger the phase change. In one known operation of a Mach Zehnder device, the refractive index of one branch is modified by heating one branch of the waveguide (i.e. utilising the above described thermo-optic effect). For a silicon waveguide, for example, the refractive index increases by $2 \times 10^{-4}$ for every degree Centigrade rise in temperature. Switching the device off and on again is achieved by heating one branch of the waveguide (so there is a phase shift between the branches of the waveguide), and then allowing it to cool to the same temperature as the other branch of the waveguide again (so there is no phase shift between the branches of the waveguide). The speed of switching on is determined by how quickly the heat can be applied, and the speed of switching off is determined by how quickly the waveguides reach the same temperature again, i.e. how long the heat takes to flow away from the hotter branch. For most materials, the phase shift achieved is approximately linear relative to the temperature difference between the branches of the waveguide, and the size of the maximum phase shift does not affect the optical losses. The known use of the thermo-optic effect to modify the refractive index, and consequently the phase in a Mach Zehnder interferometer is, however, relatively slow. This is because of the time needed for the heated branch to heat and cool again. Therefore using the known operation of a thermally driven Mach Zehnder device, typically switching is limited to the kHz operating range, i.e. of the order of $10^3$ times per second.

It is also known to use carrier injection as a means to modify the refractive index, and consequently the phase, in an interferometer such as a Mach Zehnder device. Careful design of the carrier injection means refractive index changes may be made much more quickly than using the thermo-optic effect. Typically switching using carrier injection in an interferometer can operate in the GHz range, i.e. of the order of $10^9$ times per second. Carrier injection usually decreases the refractive index of the material to which it is injected. However carrier injection also tends to heat the material into which it is injected, which tends to increase the refractive index of the material. Thus the two effects act in opposite directions on the refractive index of the material, which disadvantageously limits the maximum phase shift obtainable, and causes the phase shift response to be non-linear relative to the amount of carrier injected and the switching frequency. Also, disadvantageously, carrier induced optical losses may also occur.

We have discovered a method of using two optically connected optical waveguides, and a device incorporating such optical waveguides, which use the thermo-optic effect to introduce a relative phase change between the waveguides, but which have a much faster response than the interferometric devices using the thermo-optic effect known hitherto.

SUMMARY OF THE INVENTION

A first aspect of the invention provides a method of using an optoelectronic device comprising an upper silicon layer, including two optically connected waveguides, forming part of the upper silicon layer, the method comprising heating a first of the waveguides, cooling a second of the waveguides, thereby introducing a refractive index difference between the two waveguides, and a consequent relative phase shift between light passing through the first and second waveguides; and subsequently cooling the heated waveguide and heating the cooled waveguide, substantially to equalise the temperature of the waveguides, so that there is no relative phase shift between light passing through the first and second waveguides.

As used herein, the term "two optically connected waveguides" means that at least a portion of the light travelling through each of the two waveguides has come from another, common waveguide. One example of two optically connected waveguides, as defined herein, is a branched optical waveguide. In this case, all of the light passing through each of the branches of the branched waveguide has come from the same common waveguide, this being the so-called "stem" waveguide from which the branches of the waveguide divide. A preferred method of the invention uses an optoelectronic device comprising a branched optical waveguide, the method comprising heating a first branch of the waveguide, and cooling a second branch of the waveguide to introduce the refractive index difference and consequent relative phase shift between the branches.

Another example of two optically connected optical waveguides, as defined herein, is an evanescent coupler. An evanescent coupler is formed where two waveguides (e.g. ribs in a silicon layer) extend for a coupling distance close to each other, such that the light wave modes passing along each waveguide overlap. The overlap causes some light from one waveguide to pass to the other, and vice versa. The two waveguides in the evanescent coupler separate away from each other outside the coupling distance. Another preferred method of the invention comprises two optical waveguides forming part of an evanescent coupler.

According to the method of the present invention, the temperature of both of the optically connected waveguides is actively controlled. This is in contrast to the previously known method using a branched optical waveguide, in which only one of the branches was heated, and then allowed to cool. Active control of both of the optically connected waveguides means that a temperature differential is produced between the two waveguides more quickly than in the previously known method. Hence the speed of phase modulation achieved in the device, e.g. in an interferometer, is advantageously increased, while the advantages of using a thermo-optic effect to induce the phase modulation, i.e. a linear response and low optical losses are also achieved.

The heating of the first waveguide and cooling of the second waveguide is preferably carried out substantially simultaneously. A preferred method of achieving this comprises:

(i) providing an electrical circuit comprising a pair of dissimilar materials, each of the dissimilar materials being positioned between the first and second waveguides; and (ii) passing an electrical current around the circuit, through the dissimilar materials, thereby effecting the said heating of the first waveguide and the cooling of the second waveguide by the Peltier effect.

The Peltier effect is a known thermoelectric effect, wherein if an electrical circuit is made up of two dissimilar materials, e.g. two metals, and an electrical current is driven through the materials, then the current produces a cooling at one junction between the materials and a heating at the other junction. The Peltier effect is reversible, i.e. by reversing the direction of the current, the heating and cooling are reversed.

The Peltier effect is known to occur not only for a circuit comprising two different metals, but also for a circuit comprising a semiconductor with an n-type region and a semiconductor with a p-type region. Cooling occurs as current passes from the n-doped region to the p-doped region.

Thus by using the Peltier effect to bring about the heating of one of the optical waveguides, and the cooling of the other of the optical waveguides, according to the preferred embodiment of the invention, simultaneous heating and cooling of the respective waveguides can be achieved.

In the method according to the invention, after the initial heating and cooling of respectively the first and second waveguides, those waveguides are subsequently respectively cooled and heated, substantially to equalise the temperature of the two waveguides. That is, the hotter waveguide is cooled and the cooler waveguide is heated. By providing the electrical circuit comprising dissimilar materials, as described above, this subsequent cooling and heating is preferably achieved using the Peltier effect, simply by reversing the direction of current flow through the circuit. When the temperature of the waveguides are substantially equalised there is substantially no relative phase shift between the light passing through the respective waveguides (assuming the optical path lengths of the two waveguides are the same). The change between the presence and absence of a phase shift can be used as a switch. Thus, a preferred method according to the invention is a method of switching, involving alternately heating and cooling each of the waveguides (in opposite senses), so that there is alternately a temperature differential between the waveguides (when the switch is off), and no temperature differential between the waveguides (when the switch is on).

According to a particularly preferred embodiment of the invention, in which the Peltier effect is used to heat and cool the optically connected waveguides, the dissimilar materials comprise n- and p-doped semiconductor, preferably n- and p-doped silicon. Using such an embodiment, phase modulation, for example, to bring about switching, may be achieved in an operating range up to about 10 MHz, i.e. up to about $10^7$ times per second.

In another embodiment according to the invention, a plurality of pairs of dissimilar materials are preferably provided, arranged in series in the electrical circuit, and positioned such that each dissimilar material of each pair is positioned between the two optically connected waveguides, and the method comprises heating and cooling the respective waveguides by passing electrical current through the circuit, through each of the pairs of dissimilar materials. As before, preferred dissimilar materials are n- and p-doped semiconductors, especially n- and p-doped silicon. In this embodiment, and in the earlier single pair embodiment, metal tracking may be provided between the n and p-doped regions to complete the electrical circuit. Where metal tracking is used, dissimilar-material-junctions between the metal tracks and the n- and p-doped regions are present, and these provide the Peltier heating and cooling effect.

In alternative arrangements, the dissimilar materials may comprise two different metals provided on the surface of the silicon in place of the n- and p-doped regions.

Preferably temperature differences of at least 25° C., more preferably at least 40° C., and most preferably at least 50° C. are obtained using the Peltier effect in the various embodiments of the invention.

A second aspect of the present invention provides an optoelectronic device for use in the method described above comprising:

(i) two optically connected rib waveguides formed in the upper silicon layer;

(ii) a pair of dissimilar materials positioned so that each is between a first and second one of the rib waveguides; and (iii) means to complete an electrical circuit through the pair of dissimilar materials, so that an electrical current can be passed through the dissimilar materials in both forward and reverse directions.

In a preferred device according to the invention, a plurality of pairs of dissimilar materials are positioned so that each dissimilar material of each pair is positioned between the first and second waveguides, and the means to complete the electrical circuit is arranged to be capable of passing an electrical current in series between each pair of dissimilar materials in both forward and reverse directions. The dissimilar materials of each pair preferably comprise n- and p-doped semiconductor, most preferably n- and p-doped silicon. The use of a plurality of pairs of dissimilar materials magnifies the effect compared to the single pair embodiment.

The means to complete the electrical circuit in the device according to the second aspect of the invention may comprise metal tracking, and as described above, the metal track/doped region junctions may provide the dissimilar material junctions that are heated and cooled according to the Peltier effect.

In preferred optoelectronic devices according to the present invention, the optically connected waveguides are either branches of a branched optical waveguide, or form part of an evanescent coupler.

A preferred device according to the invention is an interferometric device, especially a Mach Zehnder interferometer, or a Michelson interferometer.

BRIEF DESCRIPTION OF THE DRAWINGS

Embodiments of the present invention will now be described, merely by way of example, with reference to the accompanying drawings, wherein:

FIG. 3 is a perspective view of the branch region of the device of FIGS. 1 and 2.

DETAILED DESCRIPTION OF THE INVENTION

Figure 1:
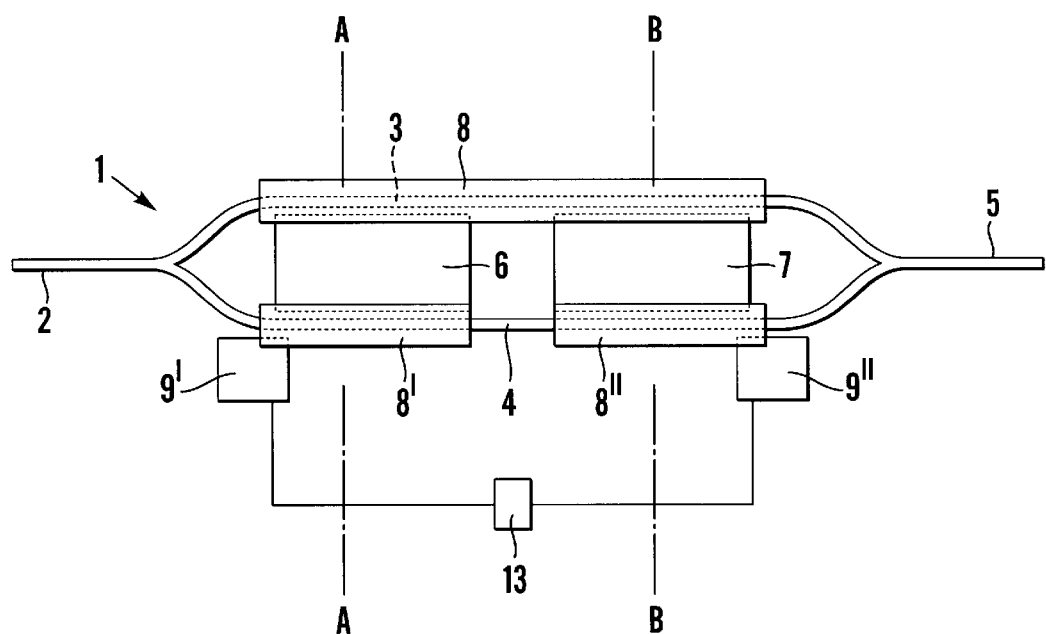
FIG. 1 is a schematic representation of a first embodiment of a device according the invention.
Figure 2A:
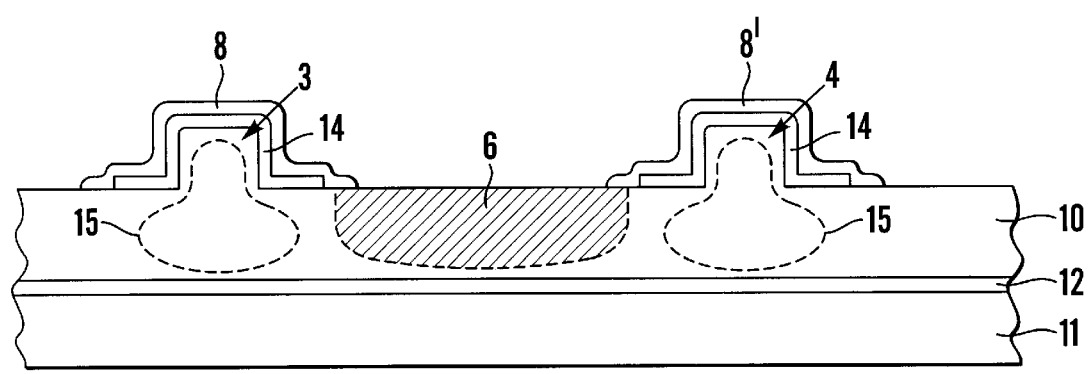
FIGS. 2a and 2b are cross-sectional views taken along line A—A and B—B respectively of the device of FIG. 1.
Figure 2B:
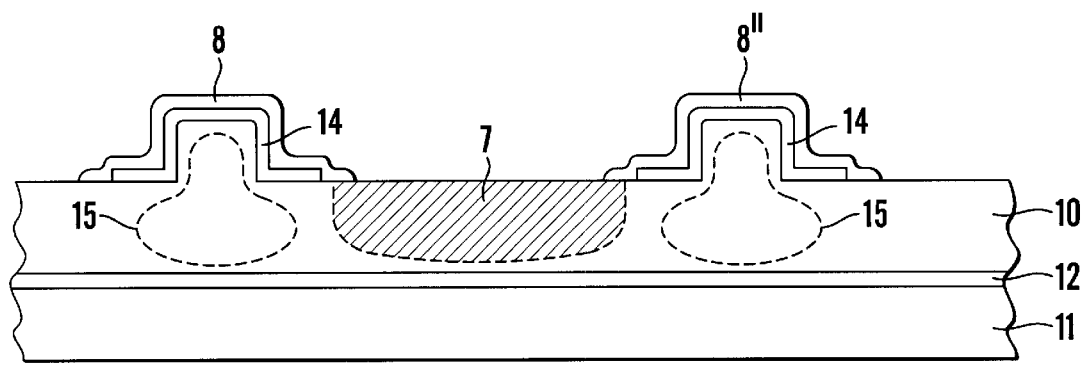

Referring now to the drawings, FIGS. 1 to 3 show a branched waveguide 1 comprising a stem 2, which divides into first and second branches 3 and 4 respectively, and then recombines to form exit waveguide 5. The two branches 3 and 4 are optically connected according to the invention, since a portion (in this case all) of the light passing through each of branches 3 and 4 comes from the same waveguide (in this case stem 2). Branches 3 and 4 of the waveguide extend substantially parallel to each other along most of their length. The stem 2, branches 3 and 4, and exit waveguide 5 are each formed as a rib in a layer of silicon 10. The rib comprises an upper surface and two side surfaces formed in an upper layer of silicon 10, which is supported on a silicon substrate 11. The upper silicon layer 10 is separated from the silicon substrate 11 by a layer of silicon dioxide insulating material 12 (FIGS. 2a, 2b, and 3). A protective layer 14 of silicon dioxide extends along the top and side surfaces of each of the ribs forming the waveguide branches 3 and 4. The protective layer 14 also extends slightly to one side of each of the ribbed waveguides 3 and 4, on the upper surface of silicon layer 10.

A first region 6 of the upper silicon layer 10, between the branches 3 and 4 of the waveguide, is n-doped, and a second region 7 of the upper silicon layer 10, between the branches 3 and 4 of the waveguide, is p-doped. The doped regions 6 and 7 are spaced longitudinally relative to each other, i.e. along the direction of the waveguides 3 and 4 (see FIGS. 1 and 3). The doped regions 6 and 7 are positioned so that they do not extend into the path of the light wave, within each ribbed waveguide 3 and 4. The light wave mode is indicated in FIGS. 2a and 2b by dotted lines 15.

A single metal conductive track 8 extends along the entire length of the rib forming branch 3 of the waveguide. Two shorter metal tracks 8' and 8" extend along the rib forming branch 4 of the waveguide, so that each is coterminous with respectively the n- and p-doped regions 6 and 7. Each of the metal tracks 8, 8' and 8" are in contact with the upper surface, and side surfaces of the respective ribbed waveguides, and also in contact with part of the upper surface of the silicon layer on either side of the ribbed waveguides. The metal tracks extend beyond the edge of the protective silicon dioxide layer 14, to make direct contact with the silicon layer 10 (see FIGS. 2 and 3).

In operation, electrical contact with a power source 13 can be made through metal contact pads 9' and 9" which are in electrical contact with the metal tracks 8', and 8" respectively so that an electrical circuit is completed. Current flows from contact pad 9', through metal track 8', the n-doped region 6, the metal track 8, the p-doped region 7 and the metal track 8" to the second contact pad 9". Since an electrical circuit is completed through junctions between dissimilar materials (the junctions between the metal tracking and each of the n- and p-doped regions 6 and 7 respectively) the junction between the materials on the side of branch 3 is cooled, and the other junction between the materials on the side of branch 4 is heated, according to the principles of the Peltier effect. More precisely, the cooling and heating occurs at the junctions between the metal and doped materials on branches 3 and 4, respectively. Since the effect of the cooling is additive along the waveguide it does not matter where it occurs, the overall effect being that branch 3 is cooled, and branch 4 is heated. Also, the metal tracks 8, 8' and 8", and the silicon of each of the branched ribs 3 and 4, act as thermal conductors and so conduct the heat (or the cooling effect) at each junction along the length of each of branches 3 and 4 of the waveguide.

The cooling and heating of branches 3 and 4 respectively of the waveguide introduces a phase shift for light travelling through branches 3 and 4, which may be used to switch the Mach Zehnder device.

In the next step of the method, the current direction is reversed. According to the Peltier effect, the heating and cooling effects are also reversed, so that branch 3 is heated and branch 4 is cooled. Current is passed in the reverse direction until the temperature of the branches is substantially equalised, so there is no longer a relative phase shift between the branches. The switch is then on. Alternate heating and cooling can be carried out in this way to switch the device on and off up to about $10^7$ times per second.

Figure 4:
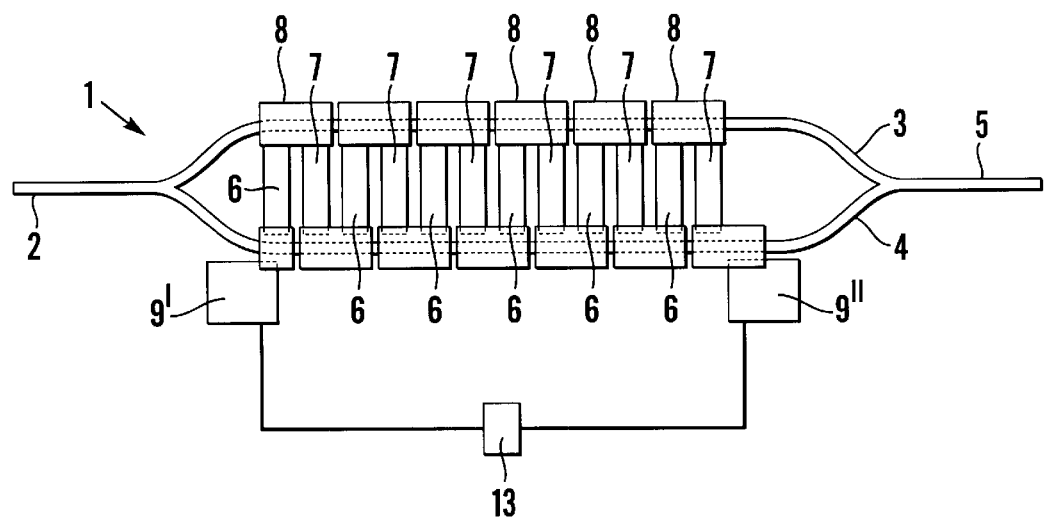
FIG. 4 is a schematic representation of a second embodiment of a device according to the invention.

FIG. 4 shows another embodiment according to the invention. Like parts are given like reference numerals compared to the embodiment shown in FIGS. 1 to 3. In this case a plurality of pairs of n- and p-doped regions are positioned between the branches 3 and 4 of the waveguide. Metal tracking in shorter lengths (referenced generally as 8*) is arranged so that electrical current can pass in series through each member of each pair of n- and p-doped regions, and then through the subsequent pair. This arrangement magnifies the effect of the embodiment of FIGS. 1 to 3.

Although the embodiments described above refer to Mach Zehnder interferometers, the invention finds general application in any optoelectronic device in which changing the relative refractive indices of the branches of a branched waveguide is useful. It could, for example, be used in a Michelson interferometer.

What is claimed is:

1. A method of using an optoelectronic device comprising an upper silicon layer and two optically connected waveguides that form part of the upper silicon layer, the method comprising:

heating a first of the waveguides;

cooling a second of the waveguides, thereby introducing a refractive index difference between the two waveguides and, consequently, a relative phase shift between light passing through the first and second waveguides, wherein the steps of heating the first of the waveguides and cooling the second of the waveguides comprise:

(i) providing an electrical circuit comprising at least one pair of dissimilar materials, each of the dissimilar materials being positioned between the first and second waveguides, wherein each of the at least one pair of dissimilar materials comprises:

an n-doped region of a semiconductor, and a p-doped region of a semiconductor, wherein the electrical circuit further comprises:

metal tracking provided in electrical contact with the n- and p-doped regions; and dissimilar-material-junctions positioned at junctions between the metal tracking and each of the n- and p-doped regions, wherein the dissimilar-material-junctions are heated and cooled via the Peltier effect to bring about the heating and cooling of the waveguides; and (ii) passing an electrical current around the electrical circuit, including through the dissimilar materials, thereby effecting the heating of the first waveguide and the cooling of the second waveguide via the Peltier effect; and cooling the heated waveguide and heating the cooled waveguide such that the temperature of the waveguides is substantially equalized and substantially no relative phase shift exists between light passing through the first and second waveguides.

2. A method according to claim 1, wherein said metal tracking extends at least part way along each of the waveguides.

3. A method of using an optoelectronic device comprising an upper silicon layer and two optically connected waveguides that form part of the upper silicon layer, the method comprising:

heating a first of the waveguides;

cooling a second of the waveguides, thereby introducing a refractive index difference between the two waveguides and, consequently, a relative phase shift between light passing through the first and second waveguides; and cooling the heated waveguide and heating the cooled waveguide such that the temperature of the waveguides is substantially equalized and substantially no relative phase shift exists between light passing through the first and second waveguides wherein the two optically connected waveguides comprise rib waveguides formed in the upper silicon layer and wherein the optoelectronic device further comprises metal tracks in contact with upper and side surfaces of the rib waveguides, and also in contact with parts of an upper surface of the upper silicon layer on opposing sides of the ribbed waveguides, wherein said metal tracks are adapted to effect said heating and cooling when an electrical current is passed through said metal tracks.

4. An optoelectronic device, comprising:

an upper silicon layer;

two optically connected rib waveguides formed in the upper silicon layer;

at least one pair of dissimilar materials positioned so that each dissimilar material is positioned between a first and second one of the rib waveguides;

means to complete an electrical circuit through the at least one pair of dissimilar materials, so that an electrical current can be passed through the dissimilar material in both forward and reverse directions;

metal tracking provided in electrical contact with the n- and p-doped regions; and dissimilar-material-junctions positioned at junctions between the metal tracking and each of the n- and p-doped regions, wherein the dissimilar-material-junctions are heated and cooled via the Peltier effect to bring about the heating and cooling of the rib waveguides.

5. An optoelectronic device according to claim 4, wherein said metal tracking extends at least part way along each of the waveguides.

6. An optoelectronic device, comprising:

an upper silicon layer;

two optically connected rib waveguides formed in the upper silicon layer;

at least one pair of dissimilar materials positioned so that each dissimilar material is positioned between a first and second one of the rib waveguides; and means to complete an electrical circuit through the at least one pair of dissimilar materials, so that an electrical current can be passed through the dissimilar material in both forward and reverse directions, wherein the at least one pair of dissimilar materials comprises a plurality of pairs of dissimilar materials positioned so that each dissimilar material of each pair is positioned between the first and second rib waveguides, and wherein the means to complete the electrical circuit is adapted to pass an electrical current in series between each pair of dissimilar materials in both forward and reverse directions.

7. An optoelectronic device, comprising:

an upper silicon layer;

two optically connected rib waveguides formed in the upper silicon layer;

at least one pair of dissimilar materials positioned so that each dissimilar material is positioned between a first and second one of the rib waveguides;

means to complete an electrical circuit through the at least one pair of dissimilar materials, so that an electrical current can be passed through the dissimilar material in both forward and reverse directions; and metal tracks in contact with upper and side surfaces of the rib waveguides, and also in contact with parts of an upper surface of the upper silicon layer on opposing sides of the rib waveguides, wherein said metal tracks are adapted to effect said heating and cooling when an electrical current is passed through said metal tracks.

* * * * *